Patented Apr. 26, 1938

2,115,487

UNITED STATES PATENT OFFICE 2,115,487

WALLPAPER PASTE

Ike Doveberg, Philadelphia, Pa.

No Drawing. Application May 12, 1936,
Serial No. 79,338

2 Claims. (Cl. 134—23.4)

The invention relates to adhesives and has special reference to a composition intended and adapted for use in "hanging" wall paper and other sheet material employed in many instances in lieu of ordinary paper.

The principal object of the invention is to provide a composition including numerous ingredients and which may be put up and marketed in dry form and of such character that upon the addition of water the material will be converted into a paste appropriate for the purpose desired.

An important object of the invention is to provide a composition which, when properly mixed with water and used for hanging wall paper, will obviate any necessity for sizing the wall and which will cause the paper, or its equivalent, to adhere closely and firmly upon any ordinary surface such as calcimining, paint, rough or smooth plaster, cement or concrete, wood, glass and metal, the paste itself being, moreover, capable of withstanding any reasonable degree of heat.

Another object is to provide a paste composition which will not stain the most delicate paper and which will be free from souring and which in addition will not be subject to the growth of mold or fungi.

A further object of the invention is to provide a paste composition which consists of simple ingredients which are readily obtainable at but little cost.

Yet another object is to provide a composition of this character in which the various ingredients in dry form may be easily mixed together without requiring any elaborate apparatus and without involving any peculiar process.

To the attainment of the foregoing and other objects and advantages, the invention preferably consists in the combination of ingredients and substantially the relative proportions thereof to be hereinafter more fully described and claimed.

In making my composition I use a preponderant amount of ordinary wheat flour together with a considerable amount of sugar, relatively small amounts of alum and dextrin together with an essential oil. While the proportion of the ingredients may be varied within reasonable limits, I have found that the following composition produces an eminently satisfactory paste material: Wheat flour, approximately four pounds; sugar, approximately one pound; alum, approximately two level tablespoonfuls; dextrin, about one level tablespoonful, and oil or essence of wintergreen, about one teaspoonful.

The above ingredients are mixed together in a dry state by any suitable means and by any appropriate method. Though the wintergreen oil or essence is not dry, yet the proportion thereof is so small that the resulting mixture is really dry, this essence being absorbed throughout the mass. This dry mixture may be conveniently put up in any desired sort of containers and marketed in an obviously convenient manner. Naturally the packages should be kept dry until it is desired to make up the actual paste. When use of paste is required, there is added to the dry mixture substantially an equal amount of boiling water, say four and one-half quarts thereof, to the specific composition above set forth. Immediately upon the addition of the boiling water the mixture must be stirred rapidly until the dry ingredients are fully dissolved. Upon cooling, the product becomes a gelatinous mass which is ready for use upon further mixing with about an equal amount of warm or cold water.

The adhesive qualities of simple boiled flour paste are known and the flour in my composition of course attains the same qualities owing to the mixing with the boiling water. The dextrin and sugar are likewise adhesive in character and in conjunction with the flour insure great tenacity so that the paste will hold upon any ordinary surface such as those above mentioned. In addition to its adhesive characteristics, the sugar is important in that it prevents souring of the made-up paste no matter how aged it may become. However, sugar will, when wetted remain moist for a long time, for which reason the addition of the alum becomes advisable to counteract this so that the paste will dry as soon as the paper, or its equivalent, is applied to a wall or otherwise used. Moreover, the alum is itself a preservative. A great many pastes are spoiled by the growth of mold or fungi but this is prevented in my composition owing to the presence of the essential oil, namely the wintergreen or its equivalent.

The paste is of course applied to paper or other wall covering materials in the same manner as any other. However, I have found that it has the great advantage of not staining even the most delicate paper and, in addition, it avoids any necessity for a preliminary sizing of the wall. Another feature is the unusual tenacity with which paper applied with my paste adheres to the surface regardless of whether the surface be rough or smooth plaster, cement or concrete, glass or metal or a previously painted or calcimined wall or other surface, and the same is true if it be applied to wood.

From the foregoing description it will be apparent that I have thus provided a very simple and inexpensive paste material or composition which has the advantage of being readily mixed in a dry condition and sold commercially in that form, and requiring but the addition of water to produce an actual paste.

While I have described certain definite proportions of the ingredients to produce a wall paper paste it should be understood that the product is capable of employment for any purposes to which analogous pastes may be put, and that the right is also reserved to make all such changes and modifications in the ingredients and proportions as will constitute no departure from the spirit of the invention or the scope of the claims hereunto appended.

Having thus described the invention, I claim:

1. A dry powder material adapted to be mixed with water to form a wall paper paste, comprising approximately 75 to 80% of wheat flour, 20 to 25% of sugar, a very small proportion of alum together with an extremely small quantity of oil of wintergreen.

2. A dry powder material adapted to be mixed with water to form a wall paper paste, said material consisting of ingredients in the proportions set forth in the formula: wheat flour, substantially four pounds; sugar, substantially one pound; alum, substantially two tablespoonfuls; dextrin, substantially one tablespoonful, and oil of wintergreen, substantially one teaspoonful.

IKE DOVEBERG.